United States Patent [19]
Lee

[11] Patent Number: 6,028,697
[45] Date of Patent: Feb. 22, 2000

[54] ERBIUM DOPED OPTICAL FIBER AMPLIFIER FOR AUTOMATICALLY TRACING AND FILTERING WAVELENGTH OF TRANSMITTED LIGHT AND ITS OPERATION METHOD

[75] Inventor: Do-Hyung Lee, Daegukwangyeok, Rep. of Korea

[73] Assignee: SamSung Electronics Co., Ltd., Kyungki-do, Rep. of Korea

[21] Appl. No.: 08/904,113

[22] Filed: Aug. 1, 1997

[30] Foreign Application Priority Data

Aug. 1, 1996 [KR] Rep. of Korea ...................... 96-32235

[51] Int. Cl.[7] ....................................................... H01S 3/00
[52] U.S. Cl. ............................................ 359/341; 359/161
[58] Field of Search ..................................... 359/341, 161

[56] References Cited

U.S. PATENT DOCUMENTS

| | | |
|---|---|---|
| 4,671,604 | 6/1987 | Soref . |
| 4,945,531 | 7/1990 | Suzuki . |
| 5,260,823 | 11/1993 | Payne et al. . |
| 5,546,210 | 8/1996 | Chraplyvy et al. . |
| 5,552,919 | 9/1996 | Majima et al. . |
| 5,570,221 | 10/1996 | Fujita . |
| 5,572,351 | 11/1996 | Hadjifotiou . |
| 5,600,467 | 2/1997 | Fee . |
| 5,625,481 | 4/1997 | Tamura et al. ........................... 359/179 |
| 5,644,423 | 7/1997 | Iwano . |
| 5,696,614 | 12/1997 | Ishikawa et al. ....................... 359/124 |
| 5,701,195 | 12/1997 | Chikama ................................. 359/341 |
| 5,900,970 | 5/1999 | Kakui ..................................... 359/341 |

FOREIGN PATENT DOCUMENTS

| | | |
|---|---|---|
| 0 555 778 A2 | 2/1993 | European Pat. Off. . |
| 0 773 641 A2 | 5/1997 | European Pat. Off. . |
| 5-257186 | 10/1993 | Japan . |
| 2 260 046 | 3/1993 | United Kingdom . |
| 2 309 578 | 7/1997 | United Kingdom . |

*Primary Examiner*—Mark Hellner
*Attorney, Agent, or Firm*—Robert E. Bushnell, Esq.

[57] ABSTRACT

An erbium doped fiber amplifier, which is equipped with an optical filter at its output port to eliminate noise caused by properties of the amplifier, automatically traces and filters transmitted light signal wavelengths using a wavelength control unit for adjusting the central wavelength of the optical filter to correspond to the wavelength of the transmitted light signal after determining the wavelength of the transmitted light signal.

11 Claims, 6 Drawing Sheets

ERBIUM DOPED OPTICAL FIBER AMPLIFIER FOR AUTOMATICALLY TRACING AND FILTERING WAVELENGTH OF TRANSMITTED LIGHT AND ITS OPERATION METHOD

CLAIM OF PRIORITY

This application makes reference to, incorporates the same herein, and claims all benefits accruing under 35 U.S.C. §119 from an application for ERBIUM DOPED OPTICAL FIBER AMPLIFIER FOR AUTOMATICALLY TRACING AND FILTERING WAVELENGTH OF TRANSMITTED LIGHT AND ITS OPERATION METHOD earlier filed in the Korean Industrial Property Office on the $1^{st}$ day of Aug. 1996 and there duly assigned Ser. No. 1996-32235, a copy of which application is annexed hereto.

BACKGROUND OF THE INVENTION

1. Field of the Invention

The present invention relates to an optical amplifier, and more particularly, it relates to an erbium doped fiber amplifier (EDFA) and its method of operation. The EDFA provided by this invention automatically traces transmitted light wavelengths and adjustably filters the wavelengths of light signals to be transmitted by adjusting the central wavelength of an optical filter installed at the output terminal of the amplifier, thereby preventing propagation of noise caused by the properties of the optical amplifier.

2. Description of the Related Art

When a transmission terminal in an optical communication network converts an electric signal into a light signal, and transmits it to a desired destination using optical fiber, EDFA are usually used to amplify the weakened light signals at predetermined distances along the transit route. This practice of periodic re-amplification ensures the transmission of stable signals. Such amplifiers are also typically installed in reception and transmission terminals to amplify electric power and perform pre-amplification.

An EDFA commonly includes a tunable filter that removes noise introduced into the amplified light signal during the amplification process. Such a filter has a central wavelength at which a light signal passed through the filter receives the least attenuation. Signal components at different wavelengths receive greater attenuation the farther those wavelengths are from the filter's central wavelength. When the filter is tuned for a central wavelength equal to the nominal wavelength of an incoming light signal, noise introduced by the amplifier can be efficiently eliminated from the amplified signal.

However, light signals received over optical communication networks do not always meet nominal parameters. In practice, such a signal will vary according to characteristics of the various components of the optical amplification device that generated or boosted it. Thus, transmitted light signal wavelengths may change as the optical amplification device operates over an extended period of time. They can also be influenced by ambient temperatures. To compensate for these effects, a wave-length-fixing type filter or a convertible-to-manual filter may be utilized. However, these approaches generally result in a loss of signal strength when instantaneous changes occur in the wavelength of the received signal. Also, they potentially create problems by decreasing the intensity of the light signals generated by the amplification device.

The use of tunable filters to remove noise introduced into optical communications signals by optical amplifiers is well known in the literature. For example, U.S. Pat. No. 4,945,531 provides a system with several tunable filters interposed between an optical wavelength demultiplexer and a multiplexer to filter spontaneous emission noise from around several channels in a WDM communications signal. U.S. Pat. No. 5,644,423 also discloses an amplifier for WDM signals that automatically adjusts a tunable filter central wavelength to trace the wavelength of a selected channel for gain control. This latter system constitutes a significant advance in EDFA filtering technology, but it requires a complicated wavelength feedback system that includes a reference oscillator and a synchronous detector to generate a wavelength error signal.

U.S. Pat. No. 5,570,221, entitled "Light Amplification Device" and issued Oct. 29, 1996 to Fujita, the disclosure of which is incorporated herein by reference, provides another substantial advance in filtering control technology. This patent discloses an EDFA that automatically adjusts the central wavelength of a tunable filter, positioned downbeam from a doped fiber amplification element, to trace the wavelength of the input signal component of an amplified signal.

The device provides many advantages, but it has a complex structure and relies upon specific features found in the output signals of typical current fiber amplifiers to achieve its objectives. In particular, it uses a two level wavelength sweep procedure: in a broad sweep, it locks onto a desired wavelength in the amplified signal by finding the wavelength where a negative peak occurs in the second derivative of the amplified signal intensity. In a narrow sweep, the intensity peak locked from the broad sweep is traced by repeatedly sweeping a narrow band to find the wavelength therein at which the first derivative of the intensity vanishes. This approach has undeniable elegance, but it requires both first and second order differentiators and also relies upon the amplified signal having a well-defined, single-peak feature corresponding to the input light signal. If the input signal is degraded, then the tests this system uses in its double sweep procedure may not provide reliable tracing results.

U.S. Pat. No. 5,572,351, entitled "Optical Communications Systems" and issued Nov. 5, 1996 1996 to Hadjifotiou, the disclosure of which is incorporated herein by reference, also provides an advanced wavelength tracing system for an EDFA having a tunable filter. The disclosed system automatically adjusts the central wavelength of the tunable filter by adding a pilot signal to the data signal at a wavelength spaced apart (above or below) the band occupied by the data signal. The frequency of the pilot component of the received signal is detected by the EDFA and the central frequency of the data band in the received signal is deduced from the received pilot frequency. This ingenious system also has certain limitations, such as requiring use of a pilot signal and relying upon comparable dispersion in the pilot signal and the data signal.

These systems, while providing significant advances, have certain limitations from which I have concluded that a wavelength-controlled EDFA with further improvements is needed. Such a system should provide robust wavelength tracing control without requiring special signal transmission formats. It should utilize only thoroughly proven control system components and should not rely upon specialized optical devices for operation. It also should not rely upon specific input signal features that may not be attainable in suboptimal operating situations.

SUMMARY OF THE INVENTION

An objective of the present invention is to provide an erbium doped fiber amplifier (EDFA) and its operation method for automatically tracing and filtering the transmitted light wavelengths in order to adjust the central wavelength of an optical filter, installed in its output stage, to the wavelength of the transmitted light, the amplifier being equipped with a microprocessor.

To this and other objectives, the present invention provides in a first aspect an optical amplifier, comprising an optical amplifying unit having an input port and an output port, an optical filter coupled to the output port and having an adjustable central wavelength, and a wavelength control unit in communication with the optical filter. The optical amplifying unit receives an incoming light signal at its input port and emits an amplified outgoing light signal at its output port. The optical filter receives the outgoing light signal and removes from it a noise component introduced by the optical amplifying unit.

The wavelength control unit includes an intensity detector for detecting an intensity of the outgoing light signal at each one of a plurality of discrete control levels within a control level range; an intensity comparator for comparing a first intensity, detected at a first one of the plurality of control levels, to a second intensity signal representative of a second intensity detected at a second one of the plurality of control levels; and a storage unit for storing a value representative of the first intensity when the first intensity is not less than the second intensity and storing a value representative of the second intensity when the first intensity is less than the second intensity.

In a second aspect, the present invention provides a method for automatically adjusting a central wavelength of an optical filter to trace a peak intensity wavelength of an output light signal. The method comprises the step of adjusting the central wavelength in accordance with each one of a plurality of discrete control levels, with a next lower control level corresponding to each one of the plurality of control levels. It comprises a further step of measuring an intensity of the output light signal at each one of the plurality of control levels and storing a value representative of the intensity. It also includes the step of selecting as a maximum intensity control level one of the plurality of control levels corresponding to a maximum value of a plurality of values consisting of the value representative of the intensity at each one of the plurality of control levels.

The method of the present invention further includes the step of adjusting the central wavelength in accordance with the next lower control level corresponding to the maximum intensity control level. It includes a step of measuring a next intensity of the output light signal at the next lower control level corresponding to the maximum intensity control level. It also includes the steps of comparing a value representative of the next intensity to the maximum value and generating a comparison result and adjusting the central wavelength in accordance with the comparison result.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE PREFERRED EMBODIMENT

Figure 1:
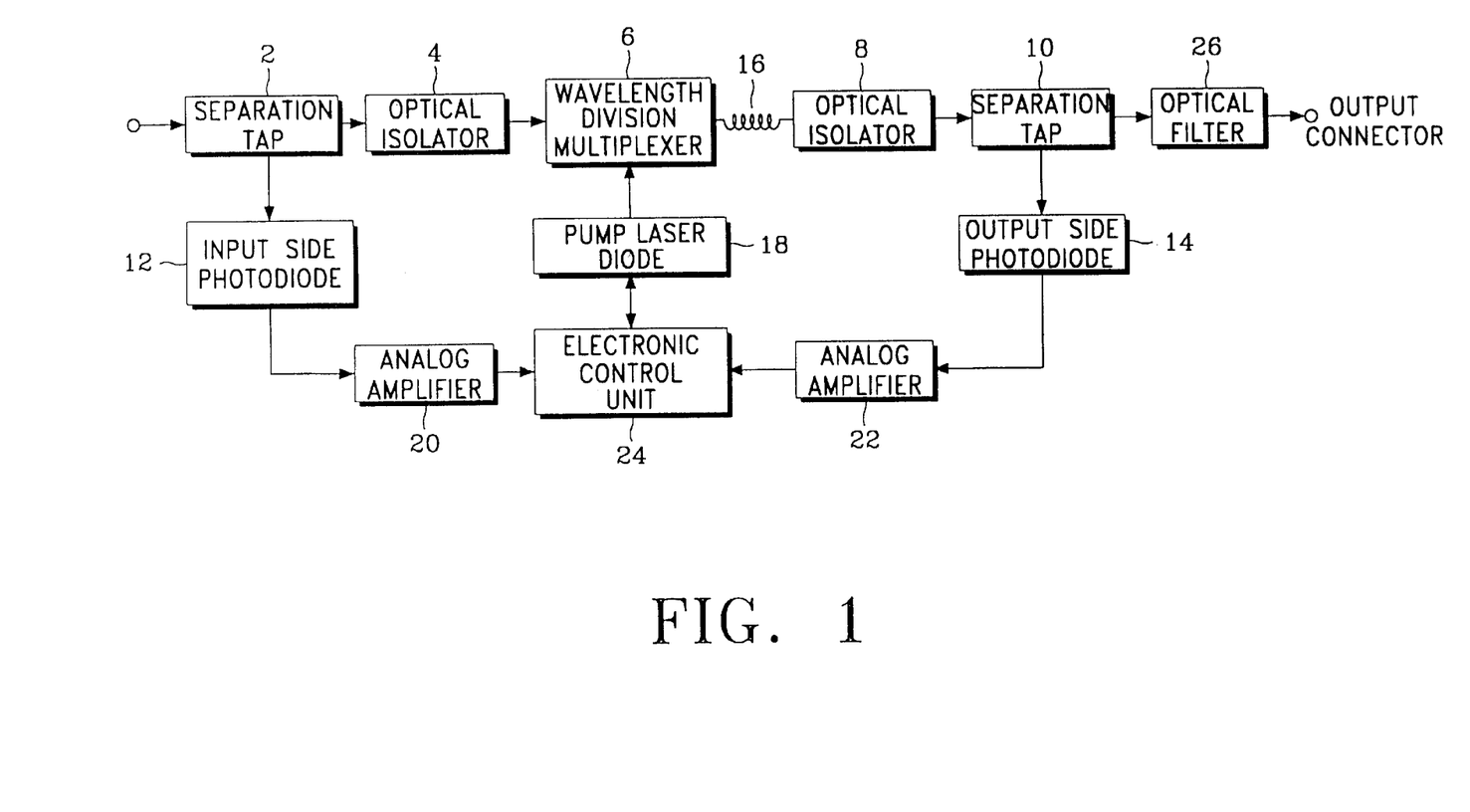
FIG. 1 is a block diagram of an existing single pumped doped fiber optical amplifier.

FIG. 1 is a block diagram of an existing single pumped amplifier that provides an example of the general context of the present invention. An input connector connects an optical fiber, leading from outside the amplifier, to an internal optical fiber contained in the amplifier. A separation tap 2 splits the input light signal from the connected optical fiber into an incoming light signal and an input side monitoring light signal in accordance with a predetermined ratio and sends them to an optical isolator 4 and an input side photodiode 12, respectively. Photodiode 12 measures the intensity of the incoming light signal.

Optical isolator 4, which has one input terminal and one output terminal, applies only minimal attenuation to light signals propagating from the input terminal to the output terminal, but it effectively interrupts light signals travelling toward the input terminal from the output terminal. Optical isolator 4 thus prevents distortion of the incoming light signal by interrupting feedback caused by amplified spontaneous emissions (ASEs) generated by amplification components of the amplifier (such as light-amplifying optical fibers).

The incoming light signal proceeds from optical isolator 4 to a wavelength division multiplexer (WDM) 6. WDM 6 receives two different light signals at different wavelengths through its respective input terminals and combines them into a single multiplexed signal, which it sends out through an optical fiber terminal. The incoming (communication) light signal has a wavelength of 1,550 nm, whereas a pump laser diode, used as an excitation light source, provides a power signal with a wavelength of typically 980 nm or 1,480 nm. WDM 6 sends the power signal (wavelength, e.g., 980 nm) and the communication signal (wavelength 1,550 nm) through an output terminal to an erbium doped amplification fiber (EDF) 16.

EDF 16 is an optical fiber doped with the rare-earth metal erbium (element number 68), which provides the fiber with high absorption rates at specific wavelengths such as 800, 980, and 1,480 nm. This doped fiber absorbs the power signal and thereby amplifies the communication signal, which has a spectral bandwidth of about 60 nm centered at a predetermined wavelength (e.g., 1,550 nm). The output end of EDF 16 is connected to an optical isolator 8, which in turn is connected to a separation tap 10. Optical isolator 8 interrupts light signals reflecting back from separation tap 10 or other optical devices in the propagating light signal's downbeam path. Finally, separation tap 10 is connected to the output stage fiber by an output connector.

Separation tap 10 receives an outgoing light signal from optical isolator 8 and splits it into an output light signal, to be output to the downbeam fiber connected via the output connector, and an output side monitoring light signal for monitoring the output light signal. The output side monitoring light signal is received by an output side photodiode 14. Photodiode 12 generates an (electrical) input monitoring signal from the input side monitoring light signal, and photodiode 14 generates an (electrical) output monitoring signal. These two monitoring signals are amplified, respectively, by two analog amplifiers 20 and 22. An electronic controller 24 receives the amplified monitoring signals and, in accordance with them, controls the output of a pump laser diode 18.

Figure 2:
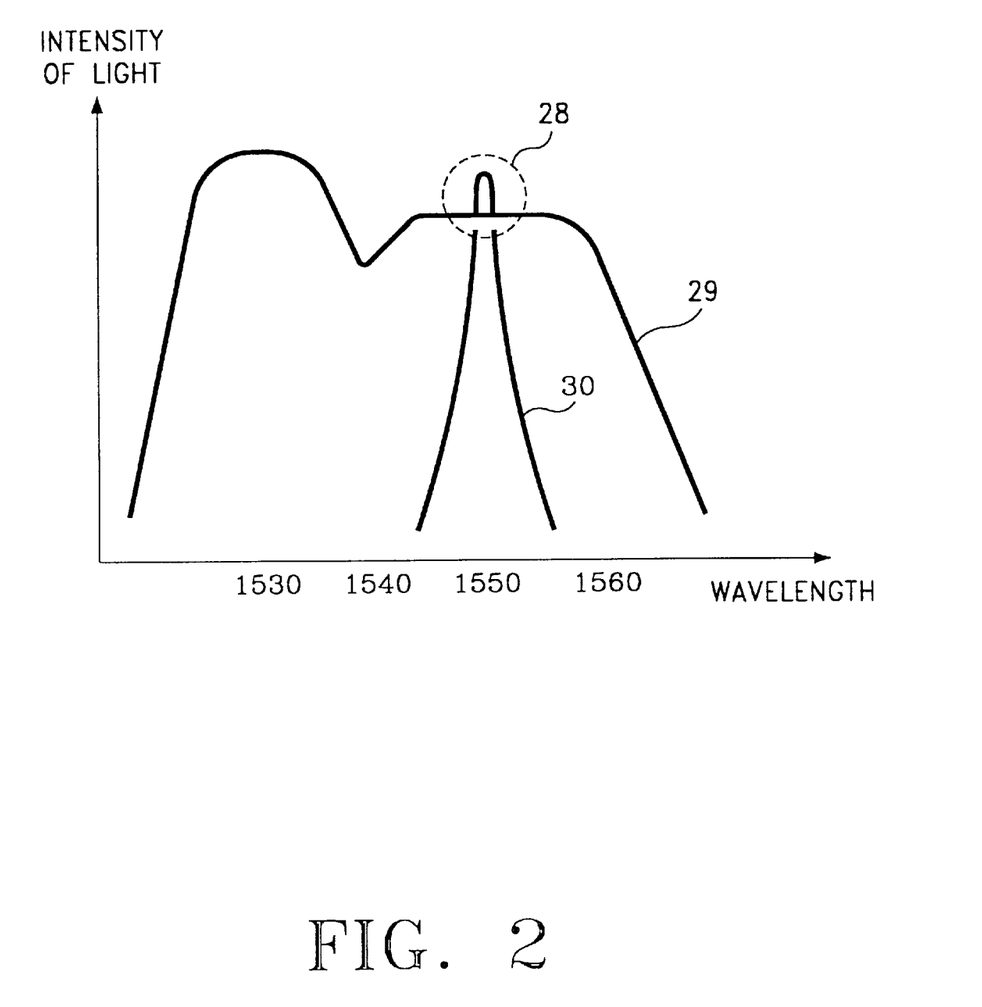
FIG. 2 is a graph showing the elimination of noise from the amplifier using a conventional optical filter.

FIG. 2 illustrates an inherent problem that arises in EDFAs when the power signal generated by pump laser diode 18 is used with EDF 16 to amplify the incoming light signal. On the one hand, fiber optic communication over long distances requires periodic amplification of the communication signals, due to signal attenuation from the transmission fibers and other optical elements through which the signals propagate. On the other hand, to realize the potentially large data bandwidths afforded by fiber optic systems, received signals must have relatively narrow spectral bandwidths. The input light signal received by an EDFA may have a desirably narrow signal peak, such as peak 28 in FIG. 2. But the amplification process of EDF 16 introduces into the amplified signal a substantial noise component 29. Accumulation of such noise components over several amplification stages would unacceptably deteriorate the communication signal peak.

To address this problem, the EDFA includes a wavelength variation filter 26 (equivalently, a wavelength fixing filter) that receives the output light signal from separation tap 10 filters out noise introduced during the amplification process. When the central wavelength of filter 26 is set at the central wavelength of the input light signal, e.g., at 1,550 nm, the noise component 29 can be efficiently eliminated from the amplified signal, leaving a sharpened signal 30.

Figure 3:
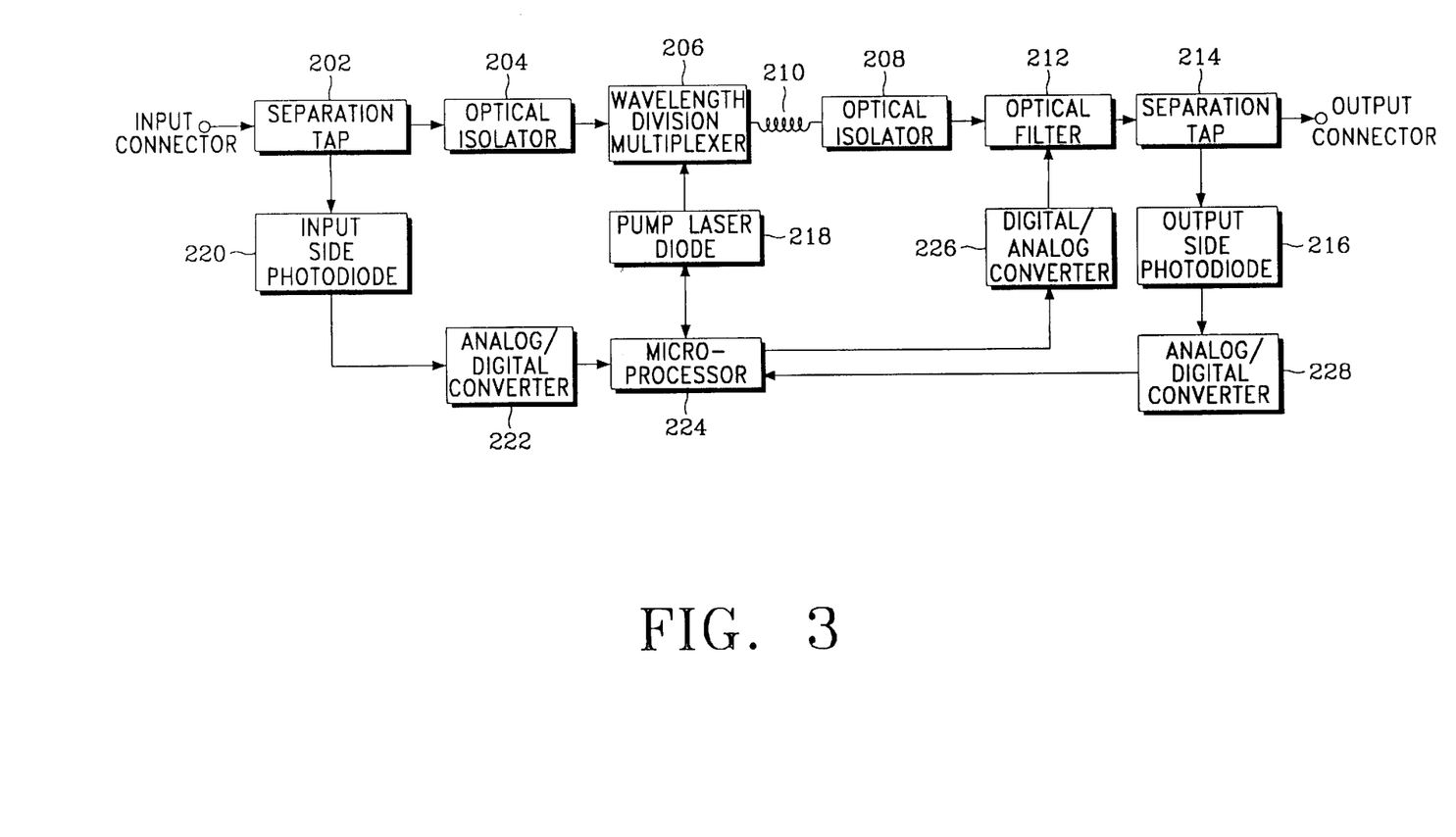
FIG. 3 is a block diagram of an EDFA which automatically traces and filters the wavelengths of the transmitted light signal according to the present invention.

FIG. 3 is a block diagram of an EDFA in accordance with the present invention. This EDFA includes separation taps 202 and 214, optical isolators 204 and 208, a wavelength division multiplexer (WDM) 206, an EDF 210, a tunable optical filter 212, photodiodes 216 and 220, and a pump laser diode 218 whose features and functions are the same as the corresponding components of the optical amplifier illustrated in FIG. 1. Detailed description of these components will therefore be omitted.

In the present invention, a microprocessor 274 replaces electronic controller 24 of the existing optical amplifier for controlling the output of pump laser diode 18. A/D converters 222 and 228 are interposed between microprocessor 224 and photodiodes 216 and 220 and convert the analog monitoring signals generated by photodiodes 216 and 220 into corresponding digital monitoring signals. Microprocessor 224 receives measurements of the incoming and outgoing light signal intensities, as detected by photodiodes 216 and 220 and converted by A/D converters 222 and 228, and thereby controls the output power of pump laser diode 218.

Microprocessor 224 serves in part as an intensity comparator of a wavelength control unit by receiving signals representing the measured intensity of the outgoing light signal and generating control signals to adjust the central wavelength of optical filter 212. The control signals from microprocessor 224 drive the central wavelength to a wavelength that induces a maximum intensity in the output light signal. Optical filter 212 is installed between output side optical isolator 208 and separation tap 214. D/A converter 226 is installed between optical filter 212 and microprocessor 224 to convert the digital signals from microprocessor 224 into analog signals.

Figure 4:
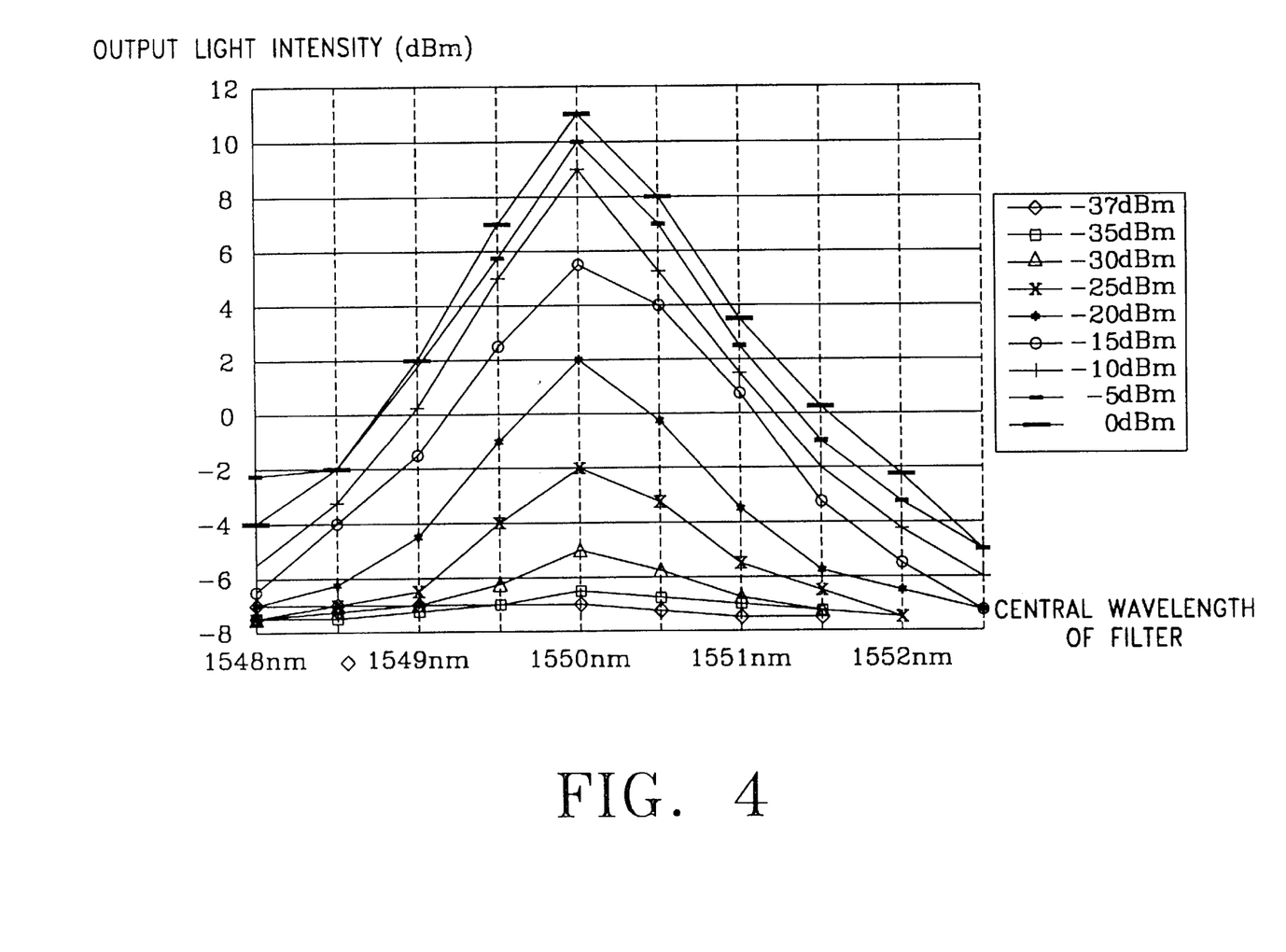
FIG. 4 is a graph showing how the intensity of the output light changes according to the central wavelength of an optical filter, which in turn corresponds to the intensity of the transmitted light, according to the present invention.

FIG. 4 illustrates the attenuation of the output light signal due to filter 212 as a function of the filter's central wavelength. When the output light signal has a peak intensity at 1,550 nm, its total light intensity is greatest when the central wavelength of the optical filter is adjusted to 1,550 nm, matching the signal's peak intensity wavelength. As the central wavelength of the filter increases or decreases, the total intensity of the output light signal decreases precipitously. For example, the graphs shown in FIG. 4 indicate that placing the central wavelength of the filter 0.5 nm below the output signal's peak intensity wavelength reduces the peak intensity by about 1 dBm and the total intensity of the output signal by about 5 dBm. Larger discrepancies between the central wavelength and the peak intensity wavelength result in greater attenuation, and the attenuation rate increases as the discrepancy increases. Thus, effective use of the available output of pump laser diode 218 depends critically upon controlling the filter central wavelength to track the peak intensity wavelength of the output light signal.

Figure 5A:
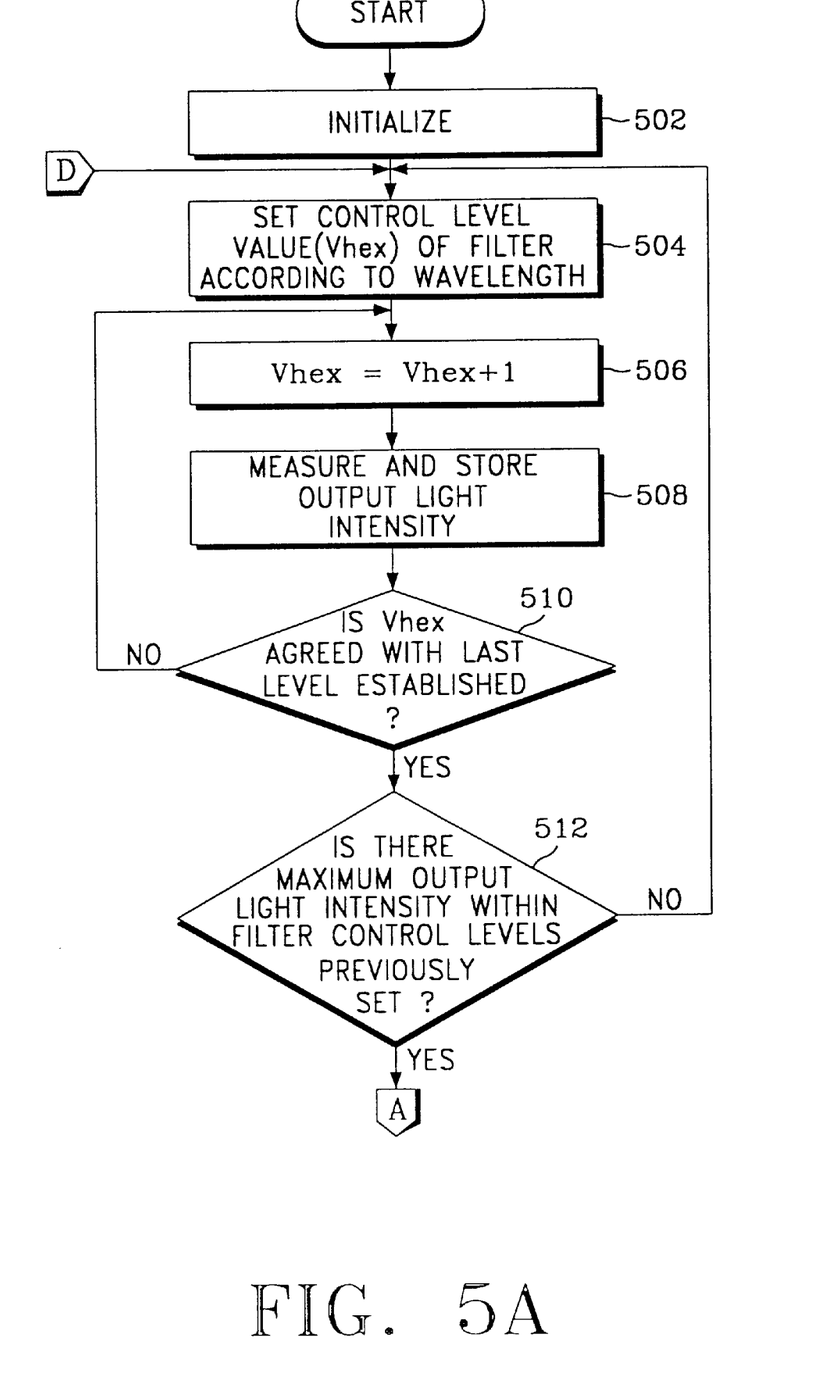
FIGS. 5A and 5B provide a flow chart illustrating the method of operation of the present invention in automatically tracing and filtering the wavelengths of the transmitted light.
Figure 5B:
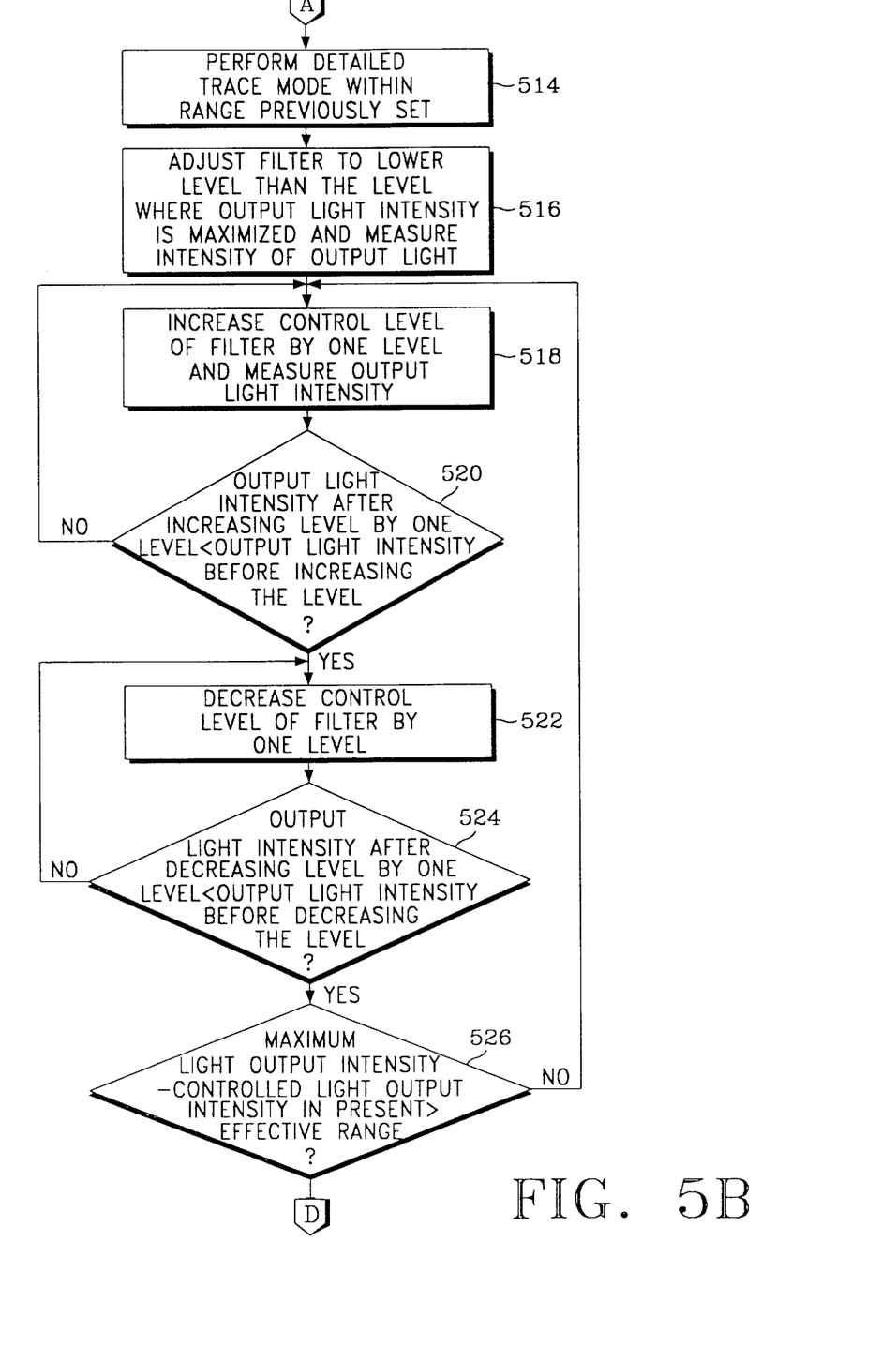

FIGS. 5a and 5b illustrate a method of operation for the device shown in FIG. 3. First, at step 502, microprocessor 224 initializes the system. This entails configuring various software registers, as will be apparent to persons skilled in the art, and specifying several operating parameters that will be described hereinbelow. Microprocessor 224 then sets a control level value (denoted Vhex) for optical filter 212 at step 504, based on the nominal wavelength of the input light signal. Vhex determines the central wavelength setting for optical filter 212. As the operation method proceeds, Vhex will be varied over a fixed range determined by the word length (number of bits) accommodated by D/A converter 226, as will be understood by persons of skill in the digital control art. In terms of wavelength ranges, the range of the control level value (Vhex) will usually be from 1,540 nm to 1,560 nm for a nominal wavelength of 1,550 nm.

Microprocessor 224 controls the central wavelength of optical filter 212 at step 506 by successively setting the control level value at each of several levels into which the range for Vhex is divided, with the number of levels depending upon the tuning resolution of optical filter 212 and upon the word length of D/A converter 226. Starting with a first level Vhex+1, at step 508 microprocessor 224 measures and stores the intensity value of the output light signal. This value is stored in a storage device (not shown), which may be a RAM device and which may constitute a component part of microprocessor 224. The intensity of the output light is measured by output side photodiode 216, and sent to microprocessor 224 through A/D converter 228.

At the step 506 microprocessor 224 determines whether the current level is the last level in the range for Vhex, which is identified for future reference in the initialization step 502. If the current level is not the final level, then microprocessor 224 performs another iteration of steps 506 and 508. If the current level is the last level, then at step 512 microprocessor 224 determines whether the maximum value of the output light intensity is within fixed control level limits. The control level limits may be chosen within a range of from +3 dBm to −35 dBm and will depend upon the characteristics of the amplifier components. The control level limits are set at the initialization step 502. If the maximum measured intensity does not fall within the control level limits, then the process returns to step 504 to reset Vhex of optical filter 212 in accordance with the value held in A/D converter 228.

If the maximum intensity value of the output light does fall within the control level limits, then at step 514 (FIG. 5B) microprocessor 224 enters a detailed trace mode for controlling the central wavelength of optical filter 212. At step 516 of the detailed trace mode, microprocessor 224 adjusts the central wavelength of optical filter 212 to the control level that is one level below the control level at which the maximum intensity value of the output light signal was previously measured, and the intensity level is again measured. microprocessor 224 increases the control level of the central wavelength of optical filter 212 by one level at step 518 and once again measures the intensity of the output light signal. At step 520, microprocessor 224 compares the output light intensity measured at step 518 to the output light intensity measured at step 516. Thus, the intensity at the control level of the previously measured maximum intensity is compared with the intensity at a control level one level lower.

If the output light intensity measured at step 518 is not less than the output light intensity measured at step 516, then the process returns to step 518 where the operations of increasing the control level and measuring the output light intensity are repeated. If the output light intensity measured at step 518 is less than the output light intensity measured at step 516, then at step 522 microprocessor 224 decreases the control level by one level and measures the intensity of the output light. Microprocessor 224 then determines at step 524 whether the output light intensity after decreasing the control level value by one level is less than the intensity before decreasing the control level. If the output light intensity before decreasing the level value is less than the intensity after decreasing the control level, then the process returns to the step 522 to repeat the operations of reducing the control level and measuring the output light intensity.

If the output light intensity before decreasing the control level is greater than the intensity after decreasing the control level, then at step 526 microprocessor 224 determines whether a subtracted intensity value, obtained by subtracting the output light intensity measured at the current control level from the maximum output light intensity stored previously, exceeds an effective range. The effective range, set at the initialization step 502, is usually about 5 dBm and is chosen in accordance with the resolution provided by the word length of D/A converter 226. If the subtracted intensity value exceeds the effective range, then the process returns to step 504, where the control level value of optical filter 212 is reset in accordance with the wavelength of the transmitted light as determined by the value held by A/D converter 228, and the process repeats. If the subtracted intensity value is less than the effective range, then the central wavelength of optical filter 212 is adjusted to the current control level. The process then goes returns to the step 518 for continuing micro-control of the central wavelength of optical filter 212 in accordance with the wavelengths of subsequently received input light signals.

As illustrated, the present invention provides a device and method for tracing the central wavelength of an amplified light signal by adjusting the central wavelength of an optical filter, installed in the output port, to a wavelength providing maximum output light signal intensity. The present invention therefore provides an optical amplifier with substantially improved reliability and efficiency. It should be noted that the device and method of the present invention achieve their advantageous results by providing an output light signal with high intensity, relative to the available power from the excitation light source, while maintaining the required sharpness of the output signal.

It should be understood also that the present invention is limited neither to the particular embodiment disclosed herein as the best mode contemplated for carrying out the invention, nor to the specific embodiments described in this specification, but instead fully encompasses the scope of the invention as defined in the appended claims.

What is claimed is:

1. An optical amplifier, comprising:
    an optical amplifying unit, having an input port and an output port, for receiving an incoming light signal at said input port and emitting an amplified outgoing light signal at said output port;
    an optical filter, coupled to said output port and having an adjustable central wavelength, for receiving said outgoing light signal and removing therefrom a noise component introduced by said optical amplifying unit; and
    a wavelength control unit in communication with said optical filter, said wavelength control unit including
        an intensity detector for detecting an intensity of said outgoing light signal at each one of a plurality of discrete control levels within a control level range,
        an intensity comparator for comparing a first intensity signal representative of a first intensity detected at a first one of said plurality of control levels to a second intensity signal representative of a second intensity detected at a second one of said plurality of control levels, and
        a storage unit for storing a value representative of said first intensity when said first intensity is not less than said second intensity and storing a value representative of said second intensity when said first intensity is less than said second intensity.

2. The optical amplifier of claim 1, further comprising:
    an input side separation tap, coupled to said input port, for splitting an input light signal into said incoming light signal and an input side monitoring light signal in accordance with a first predetermined ratio; and
    an input side photodiode, coupled to said input side separation tap, for receiving said input side monitoring light signal and generating therefrom an input monitoring signal.

3. The optical amplifier of claim 2, wherein said intensity detector includes:
    an output side separation tap, coupled to said output port, for receiving said outgoing light signal and splitting said outgoing light signal into an output side monitoring light signal and an output light signal in accordance with a second predetermined ratio; and
    an output side photodiode, coupled to said output side separation tap and in communication with said intensity comparator, for receiving said output side monitoring light signal and generating an output monitoring signal representative of said intensity of said outgoing signal.

4. The optical amplifier of claim 1, further comprising an input side A/D converter, in communication with said input side photodiode, for converting said input monitoring signal into a digital input monitoring signal.

5. The optical amplifier of claim 3, further comprising an input side A/D converter, in communication with said input side photodiode, for converting said input monitoring signal into a digital input monitoring signal.

6. The optical amplifier of claim 1, wherein said first and second intensity signals are digital signals and said intensity detector includes an output side A/D converter, in communication with said intensity comparator, for converting a first output monitoring signal representative of said first intensity into said first intensity signal and a second output monitoring signal representative of said second intensity into said second intensity signal.

7. The optical amplifier of claim 3, wherein said first and second intensity signals are digital signals and said intensity detector includes an output side A/D converter, in communication with said output said photodiode and said intensity comparator, for converting a first output monitoring signal representative of said first intensity into said first intensity signal and a second output monitoring signal representative of said second intensity into said second intensity signal.

8. The optical amplifier of claim 1, wherein said wavelength control unit further includes a D/A converter, in communication with said optical filter, for converting a digital control signal into an analog control signal and providing said analog control signal to said optical filter.

9. The optical amplifier of claim 3, wherein said wavelength control unit further includes a D/A converter, in communication with said optical filter, for converting a digital control signal into an analog control signal and providing said analog control signal to said optical filter.

10. The optical amplifier of claim 3, wherein said optical amplifying unit includes:

a pump laser diode for generating a power signal;

a wavelength division multiplexer, coupled to said input side separation tap and said pump laser diode, for receiving said power signal from said pump laser diode and said incoming light signal from said input port and outputting a multiplexed light signal containing said power signal and said incoming signal;

a rare earth doped optical fiber, coupled to said wavelength division multiplexer, for receiving said multiplexed light signal and generating therefrom said outgoing light signal;

a first optical isolator, interposed between said input side separation tap and said wavelength division multiplexer, for interrupting reflected signals; and a second optical isolator, interposed between said rare earth doped optical fiber and said optical filter, for interrupting reflected signals.

11. A method for automatically adjusting a central wavelength of an optical filter to trace a peak intensity wavelength of an output light signal, said method comprising the steps of:

adjusting said central wavelength in accordance with each one of a plurality of discrete control levels, with a next lower control level corresponding to each one of said plurality of control levels;

measuring an intensity of said output light signal at each one of said plurality of control levels and storing a value representative of said intensity;

selecting as a maximum intensity control level one of said plurality of control levels corresponding to a maximum value of a plurality of values consisting of said value representative of said intensity at each one of said plurality of control levels;

adjusting said central wavelength in accordance with said next lower control level corresponding to said maximum intensity control level;

measuring a next intensity of said output light signal at said next lower control level corresponding to said maximum intensity control level; and comparing a value representative of said next intensity to said maximum value and generating a comparison result; and adjusting said central wavelength in accordance with said comparison result.

* * * * *